(12) United States Patent
Riedijk et al.

(10) Patent No.: US 11,538,267 B2
(45) Date of Patent: Dec. 27, 2022

(54) FINGERPRINT SENSOR WITH DIFFERENTLY SIZED SENSING STRUCTURES

(71) Applicant: Fingerprint Cards AB, Gothenburg (SE)

(72) Inventors: Frank Riedijk, Delft (NL); Wouter Brevet, Delft (NL); Hans Thörnblom, Hålta (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 17/467,745

(22) Filed: Sep. 7, 2021

(65) Prior Publication Data

US 2022/0075977 A1 Mar. 10, 2022

(30) Foreign Application Priority Data

Sep. 10, 2020 (SE) .................................... 2051063-2

(51) Int. Cl.
*G06V 40/13* (2022.01)
*G06V 10/147* (2022.01)
*H04M 1/02* (2006.01)

(52) U.S. Cl.
CPC ........ *G06V 40/1306* (2022.01); *G06V 10/147* (2022.01); *H04M 1/026* (2013.01)

(58) Field of Classification Search
CPC . G06V 40/1306; G06V 10/147; H04M 1/026; H04M 1/236
See application file for complete search history.

(56) References Cited

U.S. PATENT DOCUMENTS

| | | |
|---|---|---|
| 2004/0251917 A1 | 12/2004 | Blanchard |
| 2015/0023571 A1 | 1/2015 | Gozzini et al. |
| 2016/0147375 A1 | 5/2016 | Bok et al. |
| 2017/0308234 A1 | 10/2017 | Li et al. |
| 2017/0371461 A1 | 12/2017 | Lee et al. |

FOREIGN PATENT DOCUMENTS

| | | |
|---|---|---|
| CN | 107506757 A | 12/2017 |
| WO | 2011142333 A1 | 11/2011 |

OTHER PUBLICATIONS

Swedish Search Report dated May 4, 2021 for Swedish Application No. 2051063-2, 2 pages.

*Primary Examiner* — Abhishek Sarma
(74) *Attorney, Agent, or Firm* — RMCK Law Group, PLC

(57) ABSTRACT

A fingerprint sensor comprising a plurality of electrically conductive sensing structures arranged in a sensing plane for capacitively sensing a fingerprint of a finger placed on the finger receiving surface of the fingerprint sensor arrangement, the plurality of electrically conductive sensing structures including: a first set of electrically conductive sensing structures, each sensing structure in the first set of electrically conductive sensing structures covering an area in the sensing plane being within a first area range; and a second set of electrically conductive sensing structures, each sensing structure in the second set of electrically conductive sensing structures covering an area in the sensing plane being within a second area range only including areas greater than the areas within the first area range.

17 Claims, 7 Drawing Sheets

FINGERPRINT SENSOR WITH DIFFERENTLY SIZED SENSING STRUCTURES

CROSS-REFERENCE TO RELATED APPLICATIONS

This application claims priority to Swedish Patent Application No. 2051063-2, filed on Sep. 10, 2020. The disclosure of the above application is incorporated herein by reference in its entirety.

FIELD OF THE INVENTION

The present invention relates to a fingerprint sensor to be included in a fingerprint sensor arrangement comprising dielectric material having a non-uniform thickness profile defining a topography of a finger receiving surface of the fingerprint sensor arrangement. The present invention also relates to a fingerprint sensor arrangement, and to an electronic device.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released personal communication devices, such as mobile phones.

Many electronic devices have various curved surfaces for providing an improved user experience. It would be desirable to provide for improved integration of fingerprint sensing capability in such electronic devices.

SUMMARY

In view of the above, it is an object of the present invention to provide for improved integration of fingerprint sensing capability in an electronic device having at least one curved surface portion.

According to the present invention, it is therefore provided a fingerprint sensor to be included in a fingerprint sensor arrangement comprising dielectric material having a non-uniform thickness profile defining a topography of a finger receiving surface of the fingerprint sensor arrangement, the fingerprint sensor comprising a plurality of electrically conductive sensing structures arranged in a sensing plane for capacitively sensing a fingerprint of a finger placed on the finger receiving surface of the fingerprint sensor arrangement, the plurality of electrically conductive sensing structures including: a first set of electrically conductive sensing structures arranged to be covered by a thickness of the dielectric material within a first thickness range, each sensing structure in the first set of electrically conductive sensing structures covering an area in the sensing plane being within a first area range; and a second set of electrically conductive sensing structures arranged to be covered by a thickness of the dielectric material within a second thickness range only including greater thicknesses than the first thickness range, each sensing structure in the second set of electrically conductive sensing structures covering an area in the sensing plane being within a second area range only including areas greater than the areas within the first area range.

The present invention is based on the general realization that it would be beneficial to enable a non-flat topography of a finger receiving surface, in an electronic device using a capacitive fingerprint sensor in which the sensing structures are arranged in a sensing plane. The present inventors have further realized that the sensing performance of a fingerprint sensor in such a configuration can be improved by adapting the sizes (surface areas) of the sensing structures of the fingerprint sensor to the thickness of dielectric material between the sensing plane and the finger receiving surface.

Hereby, a more uniform signal strength baseline can be achieved across the sensing plane, which in turn provides for improved fingerprint image quality, which can be translated to improved biometric authentication performance of the electronic device in which the fingerprint sensor according to embodiments of the present invention is integrated. Furthermore, the performance of the fingerprint sensor can be made considerably less sensitive to common mode interference, which may for example be introduced through the finger (via the human body) or through the electronic device in which the fingerprint sensor is integrated. The common mode interference may include low-frequency components (such as from the grid) and/or high-frequency components, which may originate from switching power supplies or NFC-signaling etc. Since the sensing structures are first in the sensing chain, mitigation of common mode interference at the sensing structures, through the differently sized sensing structures, will be more efficient at reducing the influence of common mode interference than efforts only involving other parts of the sensing chain.

Depending on the design of the electronic device into which the fingerprint sensor should be integrated, the first and second sets of electrically conductive sensing structures may be arranged and/or configured differently. For a fingerprint sensor to be integrated in a convex surface portion of an electronic device, the second set of sensing structures may be more centrally located than the first set of sensing structures. For an electronic device in which the finger receiving surface should be concave, the first set of sensing structures may be more centrally located than the second set of sensing structures, etc.

The plurality of electrically conductive sensing structures may include additional sets of sensing structures, in which the sensing structures cover areas within different area ranges. Such different area ranges may be between the first area range and the second area range.

For instance, the sensing structures may be arranged in an array with rows and columns, and each sensing structure in a given row (or column) may cover the same area. Sensing structures in different rows (or columns) may then cover different areas, in accordance with the non-uniform thickness profile.

According to some embodiments, the sensing structures may be arranged in a uniform array configuration, where the sensing structure density (the number of sensing structures per unit area) is the same across the entire sensing array. In these embodiments, various biometric operations, such as translation or rotation, may be facilitated. On the other hand, the available sensing surface of the fingerprint sensor may not be fully utilized.

According to other embodiments, the sensing structures may be arranged in a non-uniform array configuration, which may provide for a more efficient utilization of the available sensing surface of the fingerprint sensor.

In these embodiments, the sensing structures may be arranged to exhibit a spatially varying sensing structure density, that varies depending on the non-uniform thickness profile of the dielectric material to cover the sensing structures.

In particular, the sensing structure density may depend on a rate of change of the thickness of the dielectric material to cover the sensing structures. This may be beneficial for counteracting image distortion that could otherwise be introduced by converging or diverging directions for maximum signal strength across (one or more portions of) the array of sensing structures.

According to various embodiments, furthermore, the fingerprint sensor may additionally comprise measurement circuitry coupled to the plurality of electrically conductive sensing structures for providing measurement signals indicative of a capacitive coupling between each sensing structure in the plurality of electrically conductive sensing structures and the finger; and the measurement circuitry may be arranged to: provide, using a first measurement circuitry configuration, a first set of measurement signals from the first set of sensing structures; and provide, using a second measurement circuitry configuration different from the first measurement circuitry configuration, a second set of measurement signals from the second set of sensing structures.

Measurement circuitry arranged to provide different measurement circuitry configurations for the above-mentioned first and second sets of sensing structures, provides a further tool for improving the sensing performance of a fingerprint sensor with a (flat) sensing plane included in a fingerprint sensor arrangement with a non-flat finger receiving surface. In particular, the different measurement circuitry configurations may be selected for achieving an even more uniform signal strength baseline across the sensing plane, which in turn provides for improved fingerprint image quality, which can be translated to improved biometric authentication performance of the electronic device in which the fingerprint sensor according to embodiments of the present invention is integrated.

The fingerprint sensor according to embodiments of the present invention may advantageously be included in a fingerprint sensor arrangement, further comprising dielectric material covering the sensing plane of the fingerprint sensor, the dielectric material having a non-uniform thickness profile defining the topography of the finger receiving surface of the fingerprint sensor arrangement.

The dielectric material could, for example, be provided in the form of a suitably shaped window against which a planar surface of a fingerprint sensor according to embodiments of the present invention is pressed or glued. Alternatively, or in combination, the dielectric material may be molded on the sensing surface of the fingerprint sensor, whereby it can practically be ensured that there is no air gap between the sensing plane and the finger receiving surface.

In summary, embodiments of the present invention thus relate to a fingerprint sensor comprising a plurality of electrically conductive sensing structures arranged in a sensing plane for capacitively sensing a fingerprint of a finger placed on the finger receiving surface of the fingerprint sensor arrangement, the plurality of electrically conductive sensing structures including: a first set of electrically conductive sensing structures, each sensing structure in the first set of electrically conductive sensing structures covering an area in the sensing plane being within a first area range; and a second set of electrically conductive sensing structures, each sensing structure in the second set of electrically conductive sensing structures covering an area in the sensing plane being within a second area range only including areas greater than the areas within the first area range.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensor according to the present invention are mainly described with reference to a fingerprint sensor arrangement in the form of a fingerprint sensor component including a semiconductor-based capacitive fingerprint sensor integrated circuit (IC). It should be noted that the fingerprint sensor according to embodiments of the present invention need not be overmolded by dielectric material, and that the topography of the finger receiving surface could alternatively be achieved using a separate part attached to or suitably arranged in relation to the fingerprint sensor. Furthermore, the finger receiving surface of the fingerprint sensor arrangement is mainly exemplified as a convex surface. It should be noted that the present invention, as defined by the claims, is not limited to any particular shape or configuration of the finger receiving surface, other than that it is defined by a dielectric material having a non-uniform thickness profile. Accordingly, the finger receiving surface may be concave, partly convex and partly concave, or flat but inclined in relation to the sensing plane, etc. Moreover, the fingerprint sensor does not have to be elongated, but could be any other shape, such as square or round, etc. Furthermore, it should be understood that the mobile phone 1 in the figures is only one example of an electronic device comprising the fingerprint sensor according to embodiments of the present invention. The fingerprint sensor according to embodiments of the present invention may advantageously be included in many other electronic devices, including, for example, computers, electronic watches and other gadgets, as well as smart cards, etc.

Figure 1:
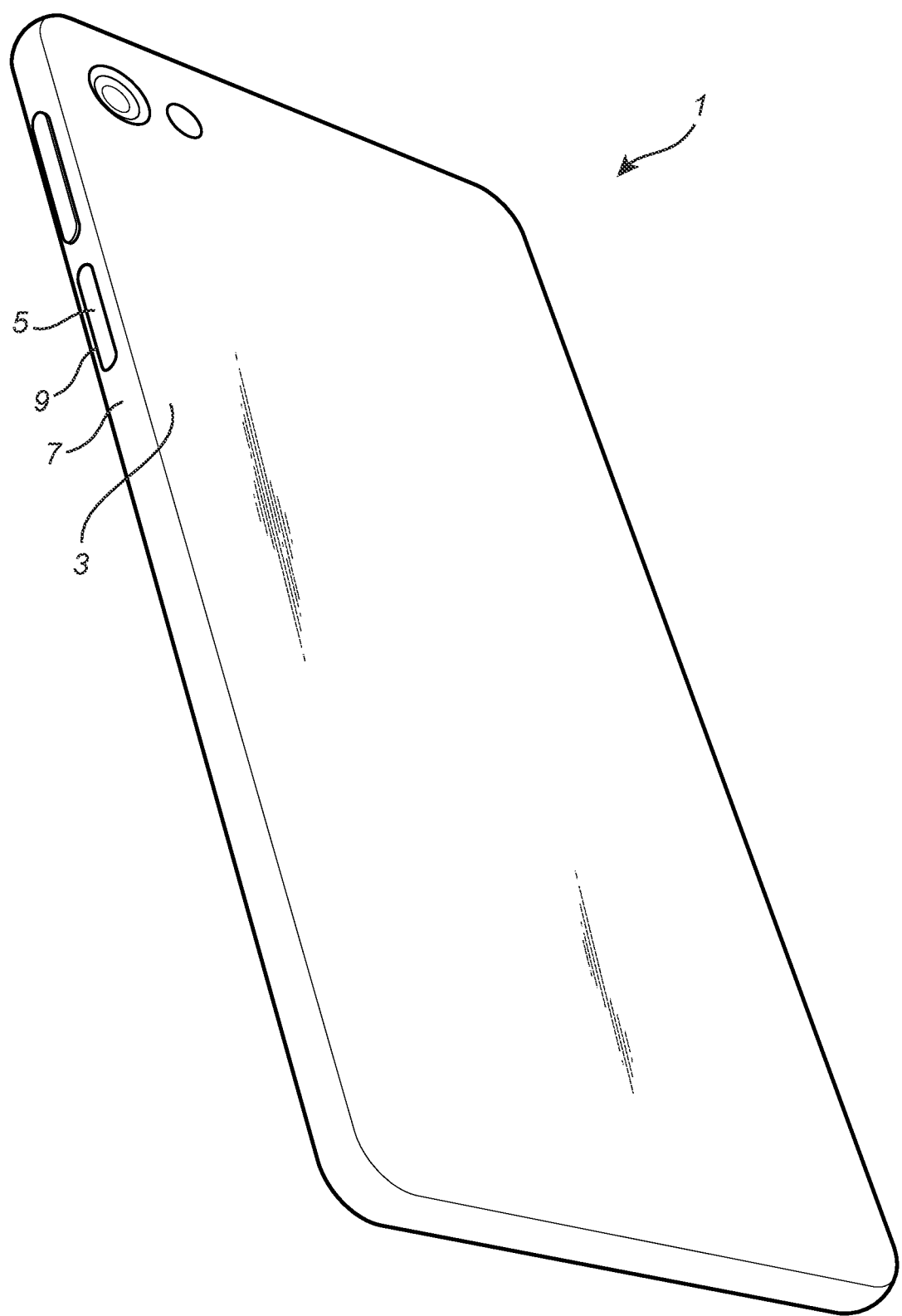
FIG. 1 is an illustration of an exemplary electronic device comprising a fingerprint sensor arrangement according to an embodiment of the present invention, in the form of a mobile phone.

FIG. 1 schematically shows an electronic device, here in the form of a mobile phone 1, comprising a device housing 3 and a fingerprint sensor arrangement, here in the form of fingerprint sensor component 5. As can be seen in FIG. 1, the device housing 3 has a convex portion 7 with an opening 9. The fingerprint sensor component 5 is arranged in the opening 9 and also exhibits a convex shape. The convex shape of the fingerprint sensor component 5 may substantially follow the convex shape of the convex portion 7 of the device housing 3, at least at the opening 9. This is better seen in the partial enlargement in FIG. 2.

Figure 2:
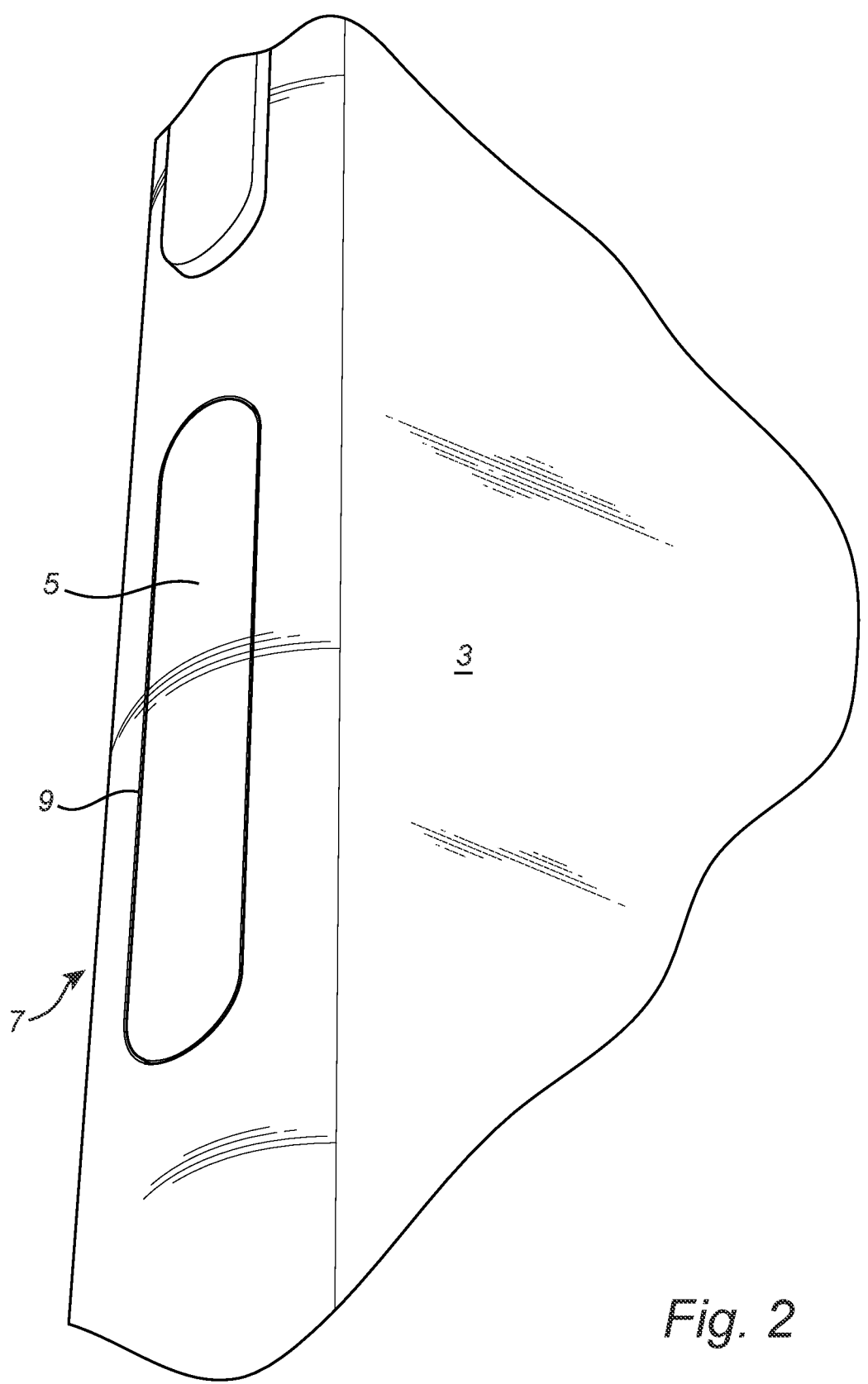
FIG. 2 is an enlarged view of a portion of the electronic device in FIG. 1.
Figure 3A:
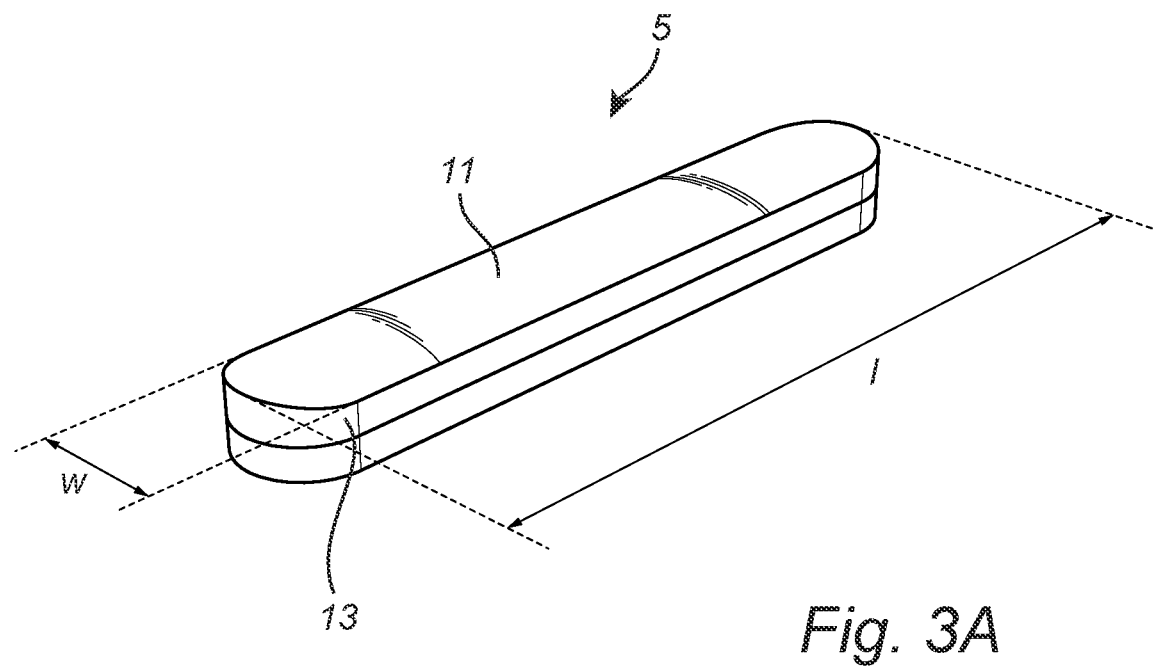
FIGS. 3A-B are perspective views of the fingerprint sensor arrangement comprised in the mobile phone in FIG. 1 and FIG. 2.
Figure 3B:
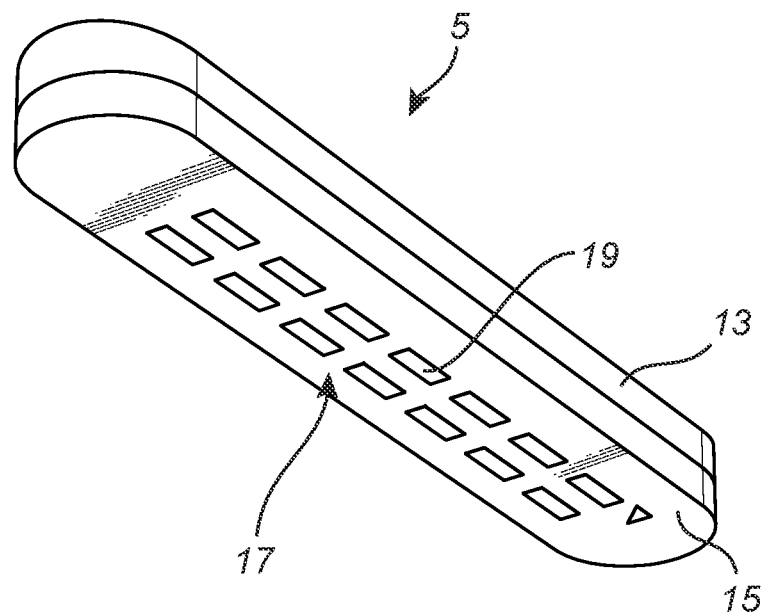

FIGS. 3A-B are perspective views of the fingerprint sensor component 5 comprised in the mobile phone 1 in FIG. 1 and FIG. 2.

FIG. 3A is a perspective view showing a component top face 11 and a side surface 13 of the fingerprint sensor component 5. As can be seen in FIG. 3A, the fingerprint sensor component 5 in this particular example configuration is elongated having a length 1 and a width w.

FIG. 3B is a perspective view showing a component bottom face 15 and the side surface 13 of the fingerprint sensor component 5. As can be seen in FIG. 3B, the fingerprint sensor component 5 has a component conductor pattern 17 on the component bottom face 15. In the embodiment of FIG. 3B, the component conductor pattern 17 defines a land grid array with a plurality of component connection pads 19 (only one of these is indicated by a reference numeral in FIG. 3B to avoid cluttering the drawing).

Figure 4:
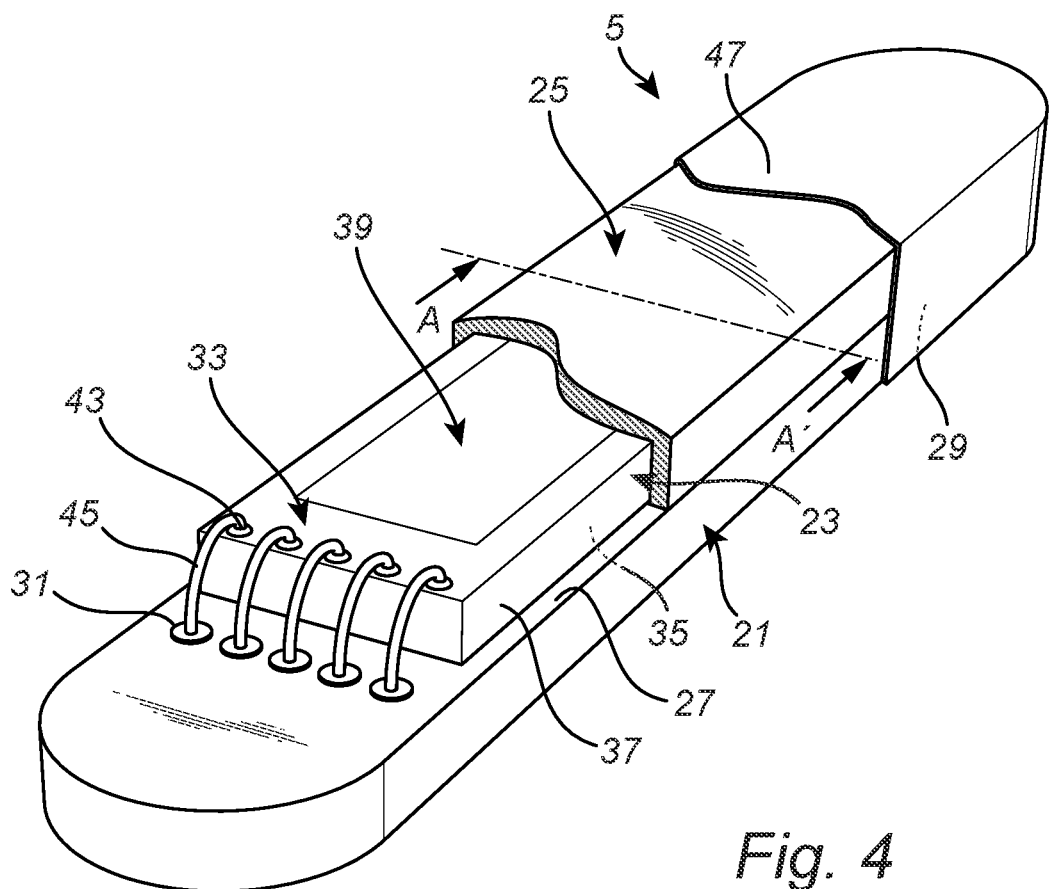
FIG. 4 is a partly opened perspective schematic illustration of the fingerprint sensor arrangement comprised in the mobile phone in FIG. 1 and FIG. 2.

FIG. 4 is a partly opened perspective schematic illustration of the fingerprint sensor component 5 comprised in the mobile phone 1 in FIG. 1, and shown in FIG. 3A and FIG. 3B.

Referring to FIG. 4, the fingerprint sensor component 5 comprises a substrate 21, a fingerprint sensor die 23, and a molding material 25. The substrate 21 has a substrate top face 27 and a substrate bottom face 29. The substrate top face 27 has a top face conductor pattern, including the bond pads 31 visible in FIG. 4, and (although not visible in FIG. 4) the substrate bottom face 29 has a bottom face conductor pattern, which may constitute the component conductor pattern 17 described above with reference to FIG. 3B. The fingerprint sensor die 23 has a die top face 33, a die bottom face 35, and a side surface 37 connecting the die top face 33 and the die bottom face 35. The die top face 33 includes a planar sensing surface 39. The die bottom face 35 of the fingerprint sensor die 23 is bonded to the substrate top face 27 of the substrate 21. As is schematically indicated in FIG. 4, the fingerprint sensor die 23 further comprises die connection pads 43, which are electrically connected to the bond pads 31 on the substrate top face 27 of the substrate 21. This electrical connection may be achieved using bond wires 45 as indicated in FIG. 4, or by any other suitable connector known to the skilled person. The molding material 25 covers the sensing surface 39 and the side surface 37 of the fingerprint sensor die 23, as well as a portion of the substrate top face 27 of the substrate 21 that is not covered by the fingerprint sensor die 23. As is schematically indicated in FIG. 4, the molding material 25 exhibits a convex shape over the sensing surface 39 of the fingerprint sensor die 23. As is schematically indicated in FIG. 4, the fingerprint sensor component 5 may optionally additionally include a colored coating 47 on top of the molding material 25.

Figure 5:
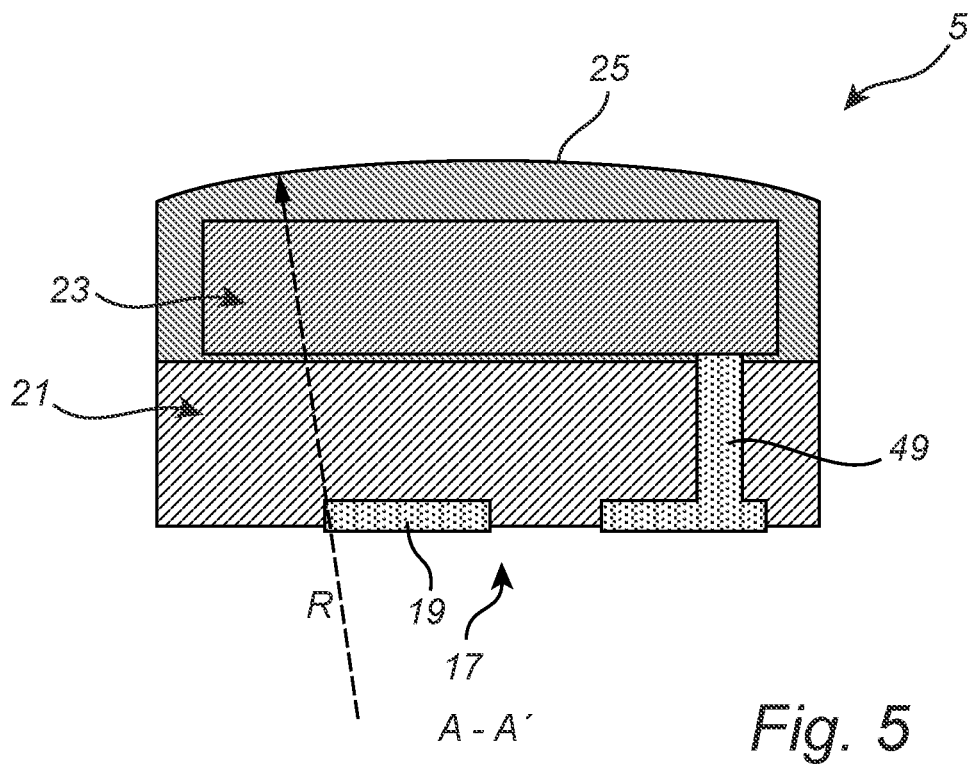
FIG. 5 is a schematic cross-section view of the fingerprint sensor arrangement in FIG. 4.

FIG. 5 is a schematic cross-section view of the fingerprint sensor component 5 in FIG. 4, of a section taken along the line A-A' in FIG. 4. In addition to what has already been described above with reference to FIG. 4, FIG. 5 schematically shows a via 49 electrically connecting the top face conductor pattern of the substrate 21 with the bottom face conductor pattern 17 of the substrate 21.

FIG. 5 also indicates an advantageous configuration of the convex shape of the molding material 25. As is indicated in FIG. 5, the top surface of the fingerprint sensor component 5 exhibits a convex shape with a radius R of curvature. The radius R of curvature of the fingerprint sensor component 5 may be adapted to substantially follow a radius of curvature of the convex portion 7 of the device housing 3 of the electronic device 1.

Figure 6A:
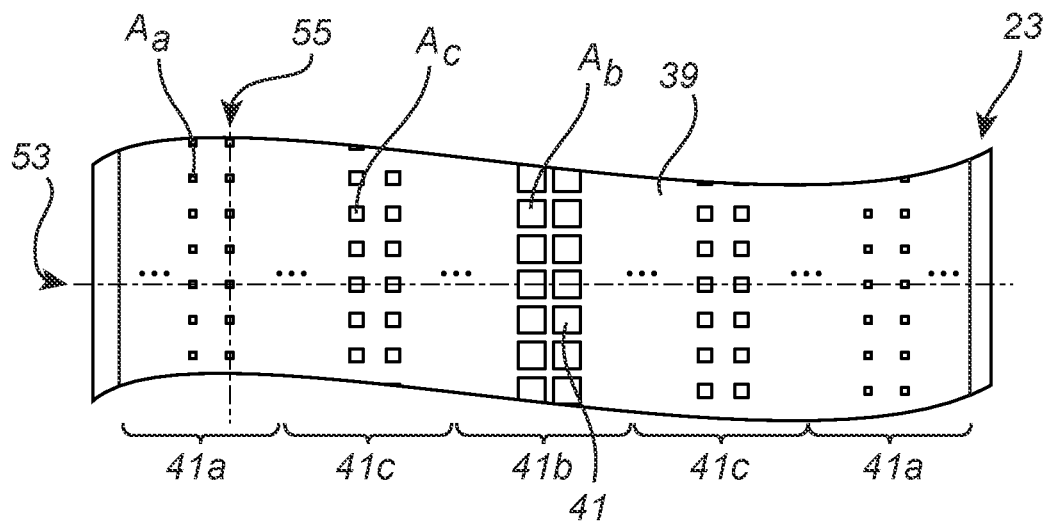
FIGS. 6A-B schematically illustrate a first embodiment of the fingerprint sensor according to the present invention.
Figure 6B:
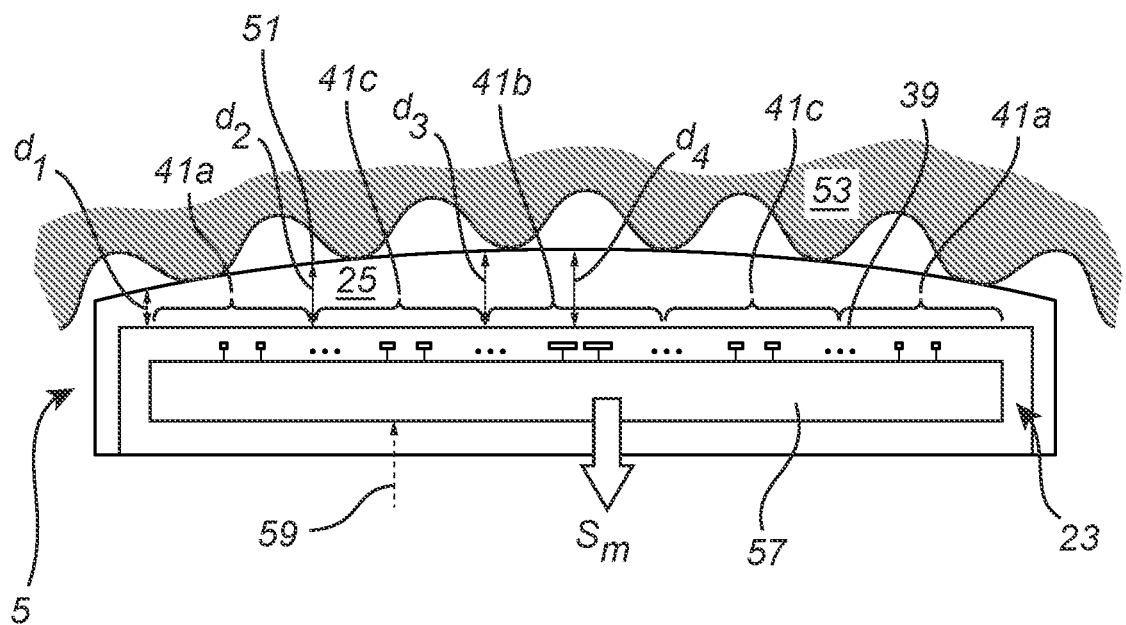

A first embodiment of the fingerprint sensor 23 according to the present invention will now be described with reference to FIGS. 6A-B, where FIG. 6A is a partial top view of the fingerprint sensor 23 without dielectric with non-uniform thickness covering the sensing surface 39, and FIG. 6B is a schematic cross-section view of a fingerprint sensor arrangement 5 comprising the fingerprint sensor 23 in FIG. 6A and dielectric material 25 having a non-uniform thickness profile defining a topography, in this case a convex topography, of a finger receiving surface 51 of the fingerprint sensor arrangement 5.

Referring to FIGS. 6A-B, the fingerprint sensor 23 comprises a plurality of electrically conductive sensing structures, here in the form of metal plates 41 arranged in a uniform array configuration in a sensing plane—the above-mentioned sensing surface 39—for capacitively sensing a fingerprint of a finger 53 placed on the finger receiving surface 51 of the fingerprint sensor arrangement 5. As may best be seen in FIG. 6A, the plurality of electrically conductive sensing structures 41 includes a first set 41a, a second set 41b, and third set 41c of sensing structures arranged in rows 53 and columns 55 with spatially constant row pitch and column pitch. Accordingly, the sensing structures 41 in the fingerprint sensor according to the first example embodiment in FIGS. 6A-B exhibit a uniform sensing structure density (number of sensing structures 41 per unit area) across the entire array. As is schematically indicated in FIGS. 6A-B, each sensing structure in the first set 41a of sensing structures covers an area being within a first area range, each sensing structure in the second set 41b of sensing structures covers an area being within a second area range, and each sensing structure in the third set 41c of sensing structures covers an area being within a third area range. The first area range includes a first area $A_a$ indicated in FIG. 6A, the second area range includes a second area $A_b$ indicated in FIG. 6A, and the third area range includes a third area $A_c$ indicated in FIG. 6A. The second area range only includes areas greater than the areas within the first area range, and the third area range is between the first area range and the second area range.

Referring mainly to FIG. 6B, the first set 41a of sensing structures is arranged to be covered by a thickness of the dielectric material 25 within a first thickness range $d_1$-$d_2$, the second set 41b of sensing structures is arranged to be covered by thickness of the dielectric material 25 within a second thickness range $d_3$-$d_4$, only including greater thicknesses than the first thickness range $d_1$-$d_2$, and the third set 41c of sensing structures is arranged to be covered by thickness of the dielectric material 25 within a third thickness range $d_2$-$d_3$, between the first thickness range and the second thickness range.

The capacitive coupling between a sensing structure 41 of the fingerprint sensor 23 and a finger 53 placed on the finger receiving surface 51 is a measure of the capacitance of the capacitor formed by the sensing structure 41, the finger 53, and the dielectric material 25 between the sensing structure 41 and the finger surface. In the configuration in FIG. 6B, the maximum capacitance (resulting from a ridge of the finger pattern in good contact with the finger receiving surface 51) can be considered to be proportional to the surface area of the sensing structure 41 and inversely proportional to the distance between the sensing structure and the finger surface. To fully compensate for differences in thickness of the dielectric material 25, the areas of the sensing structures 41 may thus vary continuously inversely with the thickness profile of the dielectric material 25. Accordingly, different sensing structures in the first set 41a of sensing structures may cover different areas, etc. This may be beneficial for reducing or avoiding possible image artifacts resulting from sudden steps in sensing structure area. It should, however, be noted that the areas covered by the sensing structures may alternatively vary step-wise. For instance, each sensing structure in the first set 41a of sensing structures may cover substantially the same area $A_a$, each sensing structure in the second set 41b may cover substantially the same area $A_b$, and each sensing structure in the third set 41b may cover substantially the same area $A_c$.

As is schematically indicated in FIG. 6B, the fingerprint sensor 23 may further comprise measurement circuitry 57 coupled to the sensing structures 41 for providing measurement signals $S_m$ indicative of the capacitive coupling between the sensing structures 41 and the finger 53. The configuration of the measurement circuitry 57 may optionally be controlled using external control signals, as is indicated by the dashed arrow 59 in FIG. 6B. In embodiments, the measurement circuitry may be arranged to use different measurement circuitry configurations for the different sets 41a-c of sensing structures. Examples of such embodiments will be described below with reference to FIG. 8 to FIG. 10.

Figure 7A:
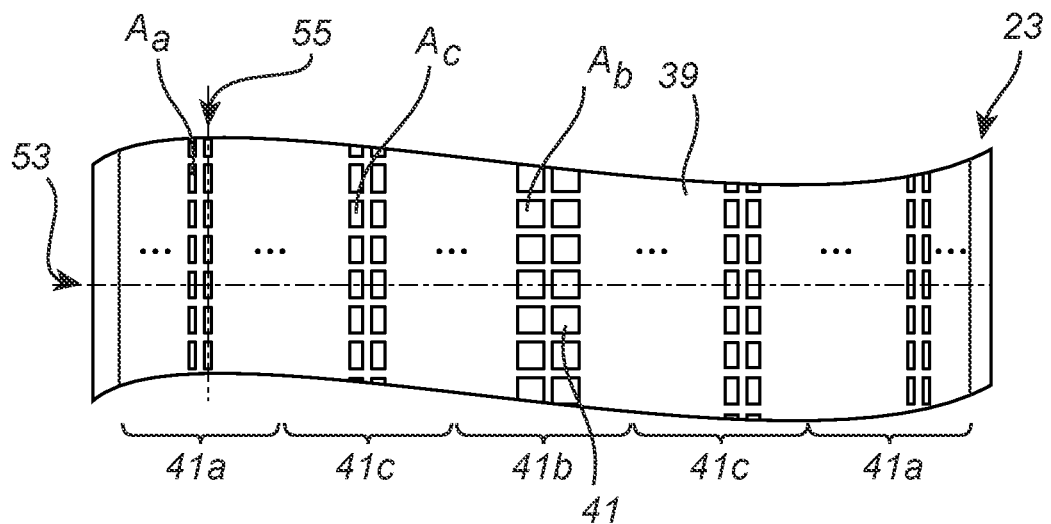
FIGS. 7A-B schematically illustrate a second embodiment of the fingerprint sensor according to the present invention.
Figure 7B:
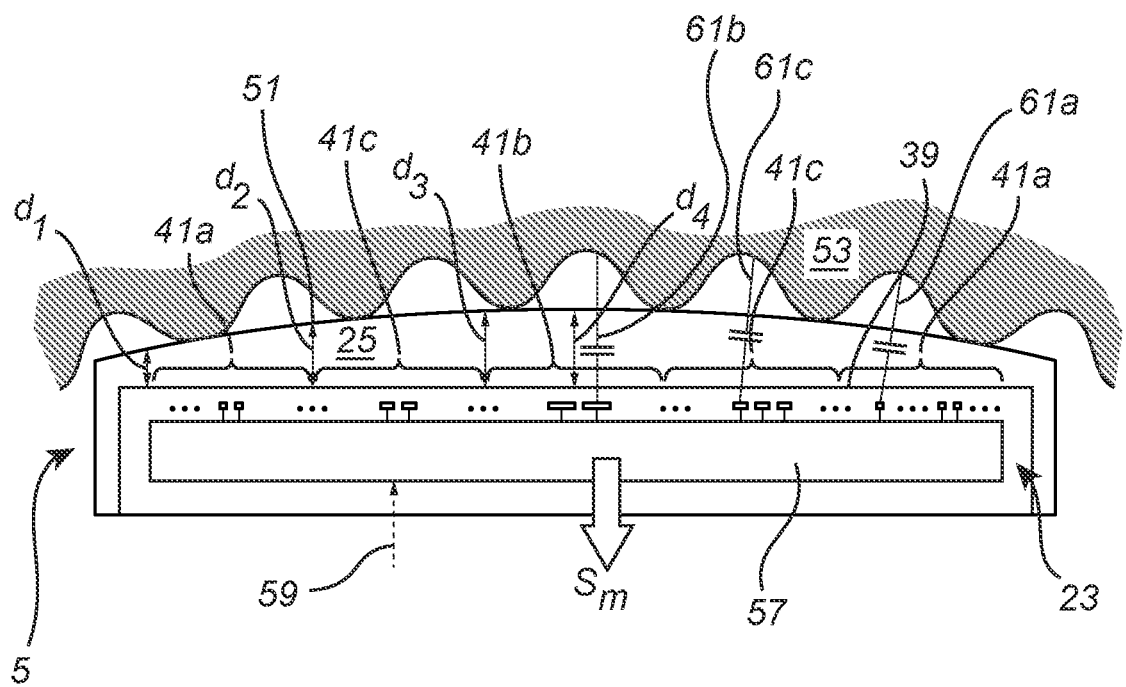

A second example embodiment of the fingerprint sensor 23 and fingerprint sensor arrangement 5 according to the present invention is schematically illustrated in FIGS. 7A-B. The second embodiment of the fingerprint sensor 23 in FIGS. 7A-B mainly differs from the first embodiment described above with reference to FIGS. 6A-B in that the sensing structures 41 are arranged in a non-uniform array configuration in the sensing plane 39. As can be seen in FIG. 7B, the sensing structures 41 are arranged to exhibit a spatially varying sensing structure density (number of sensing structures per unit area in the sensing plane 39), that varies across the sensing plane depending on the non-uniform thickness profile of the dielectric material 25 to cover the sensing structures 41. In particular, the sensing structure density is dependent on the rate of change of the thickness of the dielectric material 25, so that the average sensing structure density is greater for the first set 41a of sensing structures than for the second set 41b and the third set 41c. With the exemplary non-uniform thickness profile for the fingerprint sensor arrangement 5 in FIG. 7B, the rate of change of the thickness of the dielectric material 25 is the lowest in the central portion of the cross-section in FIG. 7B, and symmetrically increases towards the edges.

As is schematically indicated by the capacitor symbols 61a-c, the direction of maximum capacitance for a particular sensing structure 41 may not be normal to the sensing plane 39, but to the finger receiving surface 51. Therefore, a gradually varying sensing structure density as indicated in FIGS. 7A-B may assist in correcting for image distortion resulting from the non-uniform thickness profile of the dielectric material 25.

Figure 8:
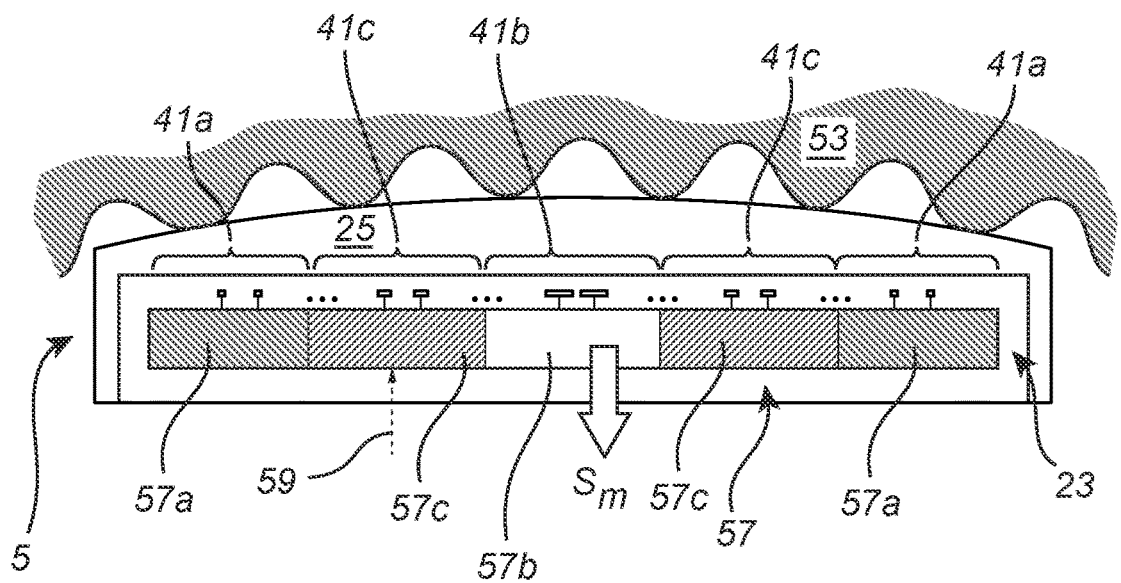
FIG. 8 schematically illustrates a third embodiment of the fingerprint sensor according to the present invention.

FIG. 8 is a cross-section view of a third example embodiment of the fingerprint sensor 23 and fingerprint sensor arrangement 5 according to the present invention, in which the measurement circuitry 57 is arranged to exhibit three different measurement circuitry configurations 57a-c. In FIG. 8, these measurement circuitry configurations 57a-c are schematically indicated as different blocks comprised in the total measurement circuitry 57. It should be appreciated that this is only an illustration to aid the understanding of this embodiment, and that the measurement circuitry does not necessarily have different configurations in different parts thereof.

The measurement circuitry 57 in the fingerprint sensor 23 in FIG. 8 is thus arranged to provide, using the first measurement circuitry configuration 57a, a first set of measurement signals resulting from capacitive coupling between the first set 41a of sensing structures and the finger 53, a second set of measurement signals resulting from capacitive coupling between the second set 41b of sensing structures and the finger 53, and a third set of measurement signals resulting from capacitive coupling between the third set 41c of sensing structures and the finger 53. The measurement signals $S_m$ provided by the measurement circuitry 57 may be a compilation of the first, second, and third sets of measurement signals.

The different configurations 57a-c of the measurement circuitry 57 can be permanent, or the measurement circuitry 57 can be controllable to change measurement circuitry configuration for all of the sensing structures 41, or for various sets of the sensing structures. This optional controllability of the configuration of the measurement circuitry is schematically indicated by the dashed arrow 59 in FIG. 8. Accordingly, the measurement circuitry 57 may be arranged to provide the first set of measurement signals, the second set of measurement signals, and the third set of measurement signals (if applicable) during a fingerprint capture operation to allow formation of a fingerprint representation $S_m$ comprising the first set of measurement signals, the second set of measurement signals, and the third set of measurement signals (if applicable). For instance, the measurement circuitry 57 may be arranged to simultaneously provide the first set of measurement signals, the second set of measurement signals, and the third set of measurement signals (if applicable). Alternatively, a first fingerprint capture operation may be performed using the first measurement circuitry configuration 57a, and a second, subsequent, fingerprint capture operation may be performed using the second measurement circuitry configuration 57b, etc.

In a given measurement circuitry configuration, one or more properties of the measurement circuitry 57 may be adapted to the non-uniform thickness profile of the dielectric material 25 intended to cover the sensing plane 39 of the fingerprint sensor 23. For example, parameters such as offset, gain, or timing may be different for different sensing structures 41, depending on the intended non-uniform thickness profile of the dielectric material 25. For instance, the offset and/or gain and/or measurement timing may be set to compensate for sensitivity variations across the fingerprint sensor 23, resulting from the non-uniform thickness profile. In embodiments where different sets 41a-c of sensing structures include sensing structures covering different areas in the sensing plane 39, different configurations 57a-c of the measurement circuitry 57 may be used to amplify or adjust for the effects of the different sizes of the sensing structures 41. For example, the measurement circuitry configurations 57a-c may be tuned to compensate for misalignment that may occur and that may cause spatial offset between the sensing structure pattern and the non-uniform thickness profile of the dielectric material 25.

Figure 9:
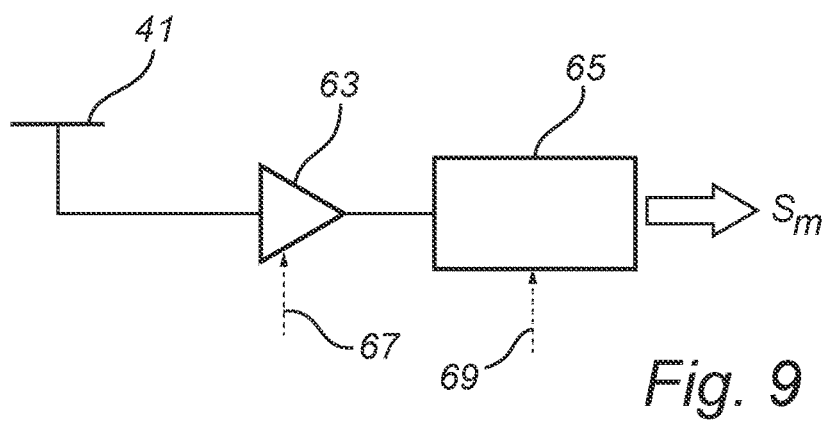
FIG. 9 schematically shows a first example configuration of the measurement circuitry in the fingerprint sensor in FIG. 8.

FIG. 9 schematically shows a first example configuration of the measurement circuitry 57 in the fingerprint sensor in FIG. 8, comprising amplifier circuitry 63 and analog-to-digital converter (ADC) circuitry 65. As is schematically indicated in FIG. 9, the amplifier circuitry 63 receives input from one or several sensing structures 41, and provides an amplified analog signal to the ADC circuitry 65. The ADC circuitry 65 outputs digital measurement signals $S_m$. To provide different measurement circuitry configurations for different parts of the fingerprint sensor 23, the amplifier circuitry 63 and/or the ADC circuitry 65 may exhibit different properties for sensing structures 41 located in these different parts of the fingerprint sensor 23. To that end, the amplifier circuitry 63 and/or the ADC circuitry 65 may be structured differently for sensing structures 41 located in different parts of the fingerprint sensor 23. Alternatively, the amplifier circuitry 63 may be controllable using one or more external analog and/or digital control signals (illustrated by the dashed arrow 67) and/or the ADC circuitry 65 may be controllable using one or more external control signals (illustrated by the dashed arrow 69).

Figure 10:
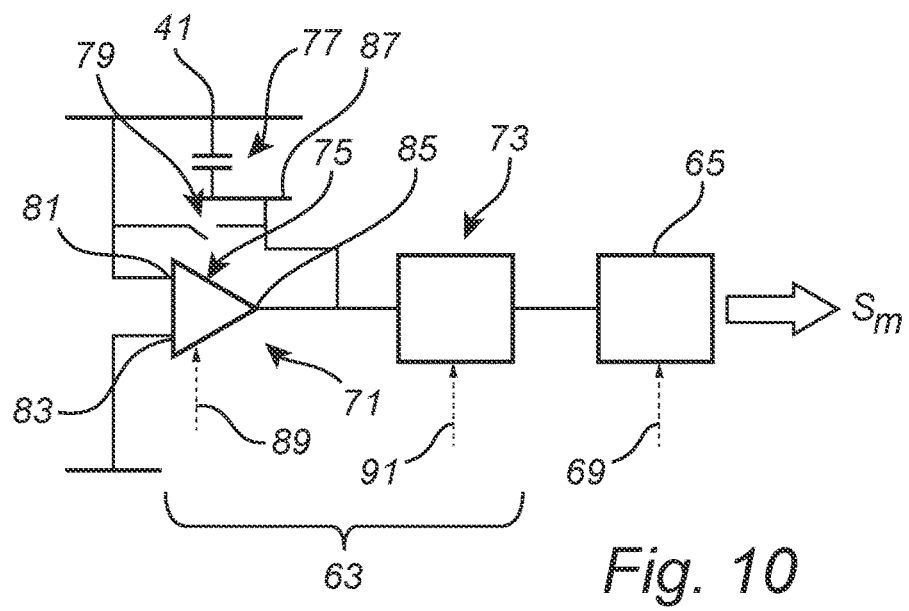
FIG. 10 schematically shows a second example configuration of the measurement circuitry in the fingerprint sensor in FIG. 8.

FIG. 10 schematically shows a second example configuration of the measurement circuitry in the fingerprint sensor in FIG. 8, in which the amplifier circuitry 63 is shown to comprise a charge amplifier 71, and a sample-and-hold amplifier 73. The charge amplifier 71 may include an operational amplifier 75, a feedback capacitor 77 and a reset switch 79. A first input 81 of the operation amplifier 75 may be connected to the sensing structure 41, and a second input 83 of the operation amplifier 75 may be connected to ground, or to a controllable voltage source depending on the overall configuration of the fingerprint sensor arrangement 5. The output 85 of the operational amplifier 75 is connected to the sample-and-hold amplifier 73, and feedback coupled to the first input 81 via the feedback capacitor 77 formed by the sensing structure 41 and a feedback plate 87. The charge amplifier 71 can be reset by operating the reset switch 79 to short-circuit the first input 81 and the output 85.

The amplifier circuitry 63 may operate in a, per se, known manner to provide analog signals to the ADC circuitry 65. Properties of the amplifier circuitry 63 may, for example, be controlled using control signals affecting the offset of the operational amplifier (indicated by the dashed arrow 89), the measurement time (by controlling the timing of operation of the reset switch 79), or using control signals affecting the offset and/or gain of the sample-and-hold amplifier 73 (indicated by the dashed arrow 91). Alternatively, or in combination, different charge amplifiers 71 may permanently have different properties. For instance, the gain of the charge amplifier 71 is affected by the area of the feedback plate 87.

Although it is indicated in FIG. 9 and FIG. 10 that one amplifier circuit is connected to a single sensing structure 41, it should be noted that this is not necessarily the case, and that, for example, one amplifier circuit may be connected (selectively connectable) to a plurality of sensing structures 41.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A fingerprint sensor to be included in a fingerprint sensor arrangement comprising dielectric material having a non-uniform thickness profile defining a topography of a finger receiving surface of the fingerprint sensor arrangement, the fingerprint sensor comprising a plurality of electrically conductive sensing structures arranged in a sensing plane for capacitively sensing a fingerprint of a finger placed on the finger receiving surface of the fingerprint sensor arrangement, the plurality of electrically conductive sensing structures including:
   a first set of electrically conductive sensing structures arranged to be covered by a thickness of the dielectric material within a first thickness range, each sensing structure in the first set of electrically conductive sensing structures covering an area in the sensing plane being within a first area range; and
   a second set of electrically conductive sensing structures arranged to be covered by a thickness of the dielectric material within a second thickness range only including greater thicknesses than the first thickness range, each sensing structure in the second set of electrically conductive sensing structures covering an area in the sensing plane being within a second area range only including areas greater than the areas within the first area range.

2. The fingerprint sensor according to claim 1, wherein each sensing structure in the second set of sensing structures covers an area in the sensing plane being at least 25% greater than an area in the sensing plane covered by each sensing structure in the first set of sensing structures.

3. The fingerprint sensor according to claim 1, wherein the sensing structures are arranged in a uniform array configuration.

4. The fingerprint sensor according to claim 1, wherein the sensing structures are arranged in a non-uniform array configuration.

5. The fingerprint sensor according to claim 4, wherein the sensing structures are arranged to exhibit a spatially varying sensing structure density.

6. The fingerprint sensor according to claim 5, wherein the sensing structure density depends on a rate of change of the thickness of the dielectric material to cover the sensing structures.

7. The fingerprint sensor according to claim 4, wherein:
   the first set of sensing structures comprises a plurality of sensing structures exhibiting a first average sensing structure density; and
   the second set of sensing structures comprises a plurality of sensing structures exhibiting a second average sensing structure density, different from the first average sensing structure density.

8. The fingerprint sensor according to claim 1, wherein the fingerprint sensor is elongated with a length of the fingerprint sensor being at least 2 times greater than a width of the fingerprint sensor.

9. The fingerprint sensor according to claim 1, wherein:
   the fingerprint sensor further comprises measurement circuitry coupled to the plurality of electrically conductive sensing structures for providing measurement signals indicative of a capacitive coupling between each sensing structure in the plurality of electrically conductive sensing structures and the finger; and
   the measurement circuitry is arranged to:
      provide, using a first measurement circuitry configuration, a first set of measurement signals resulting from capacitive coupling between the first set of sensing structures and the finger; and
      provide, using a second measurement circuitry configuration different from the first measurement circuitry configuration, a second set of measurement signals resulting from capacitive coupling between the second set of sensing structures and the finger.

10. The fingerprint sensor according to claim 9, wherein the measurement circuitry is arranged to provide the first set of measurement signals and the second set of measurement signals during a fingerprint capture operation to allow formation of a fingerprint representation comprising the first set of measurement signals and the second set of measurement signals.

11. The fingerprint sensor according to claim 10, wherein:
the first measurement circuitry configuration includes a first setting for at least one of an offset and a gain of the measurement circuitry; and
the second measurement circuitry configuration includes a second setting, different from the first setting, for at least one of the offset and the gain of the measurement circuitry.

12. The fingerprint sensor according to claim 10, wherein the measurement circuitry is arranged to simultaneously provide the first set of measurement signals and the second set of measurement signals.

13. The fingerprint sensor according to claim 12, wherein:
the first measurement circuitry configuration includes a first setting for at least one of an offset and a gain of the measurement circuitry; and
the second measurement circuitry configuration includes a second setting, different from the first setting, for at least one of the offset and the gain of the measurement circuitry.

14. The fingerprint sensor according to claim 9, wherein:
the first measurement circuitry configuration includes a first setting for at least one of an offset and a gain of the measurement circuitry; and
the second measurement circuitry configuration includes a second setting, different from the first setting, for at least one of the offset and the gain of the measurement circuitry.

15. A fingerprint sensor arrangement, comprising:
the fingerprint sensor according to claim 1; and
dielectric material covering the sensing plane of the fingerprint sensor, the dielectric material having a non-uniform thickness profile defining the topography of the finger receiving surface of the fingerprint sensor arrangement.

16. The fingerprint sensor arrangement according to claim 15, wherein the finger receiving surface comprises a convex portion.

17. An electronic device comprising:
a device housing with a curved portion having an opening; and
the fingerprint sensor arrangement according to claim 15 arranged in the opening of the curved portion of the device housing.

* * * * *